US012272381B2

(12) United States Patent
Mathur et al.

(10) Patent No.: US 12,272,381 B2
(45) Date of Patent: Apr. 8, 2025

(54) DIFFERENCE ENGINE FOR MEDIA CHANGE MANAGEMENT

(71) Applicant: Avid Technology, Inc., Burlington, MA (US)

(72) Inventors: Shailendra Mathur, Beaconsfield (CA); Timothy H Claman, Andover, MA (US)

(73) Assignee: AVID TECHNOLOGY, INC., Burlington, MA (US)

( * ) Notice: Subject to any disclaimer, the term of this patent is extended or adjusted under 35 U.S.C. 154(b) by 259 days.

(21) Appl. No.: 17/647,029

(22) Filed: Jan. 5, 2022

(65) Prior Publication Data

US 2023/0215467 A1  Jul. 6, 2023

(51) Int. Cl.
*G11B 27/031* (2006.01)

(52) U.S. Cl.
CPC ................ *G11B 27/031* (2013.01)

(58) Field of Classification Search
CPC ................................... G11B 27/031
See application file for complete search history.

(56) References Cited

U.S. PATENT DOCUMENTS

| 9,448,789 B2 | 9/2016 | Mathur |
| 9,864,973 B2 | 1/2018 | Claman |
| 2014/0258968 A1* | 9/2014 | Brown .............. G06Q 10/06 717/103 |
| 2022/0138950 A1* | 5/2022 | Gupta .............. G06T 7/254 382/173 |
| 2023/0141448 A1* | 5/2023 | Bv .............. G06F 40/197 715/229 |

OTHER PUBLICATIONS

The Society of Motion Picture and Television Engineers, SMPTE Standards ST 2067-2:2020, Interoperable Master Format—Core Constraints, Feb. 20, 2016, pp. 1, 2 & 38, White Plains, NY.
Avid Film Scribe User Guide, Jan. 1, 2004, pp. 1-4 & 23-28.
Walter F. Tichy, RCS—A System for Version Control, Jul. 1985, Department of Computer Sciences, Perdue University, West Lafayette, Indiana.
Martin Fowler, Event Sourcing, martinfowler.com, Dec. 12, 2005.

* cited by examiner

*Primary Examiner* — Mishawn N. Hunter
(74) *Attorney, Agent, or Firm* — Oliver Strimpel

(57) ABSTRACT

A universal media difference engine generates a change list specifying the edits required to create an edited revision of a media composition from a base version. The difference engine determines the format of the media composition, locates and installs a plug-in corresponding to the format, and uses the plug-in to parse the composition and generate the change list. The supported compositional formats include formats native to specific media editing applications, as well as interoperable formats. The difference engine is able to convert rich change lists expressed in native form to canonical change lists that are compatible with multiple editing applications. Timeline, mixer configuration, and scene graph composition types are supported. Content management system storage requirements are reduced by storing a base version and change lists instead of multiple revisions of the composition. A media composition recreation engine recreates an edited revision by applying a change list to a prior version.

6 Claims, 13 Drawing Sheets

DIFFERENCE ENGINE FOR MEDIA CHANGE MANAGEMENT

When multiple parties use different tools to create and/or edit a media composition collaboratively, it is a challenge to enable each of the parties to receive changes other parties have made in a form that enables them to view and natively edit the most current state of the composition. Examples of creative tools for media creation and editing include non-linear video editing applications, and digital audio workstations. The problem arises because each creative tool has a different internal compositional data model that specifies the relationship among the data elements comprising a composition. Furthermore, the various creative tools use different compositional formats, which specify a structural layout of the data comprising a composition, even if their compositional data models are similar. Thus, compositions expressed in the format native to a given creative tool are opaque to another creative tool. This poses a challenge since most media compositions are created and edited by multiple parties, each using a different creative tool.

Current methods of facilitating collaborative media editing with creative tools having incompatible compositional data models and formats rely on methods that involve the sharing of compositions that have been converted into a standardized, interoperable format. The interoperable format represents a "lowest common denominator" of the set of compositional formats native to each of the individual creative tools. As such, a media composition represented in the interoperable format cannot contain the richness of the native format compositions, since the latter capture the full spectrum of editing functionality that each individual application is capable of. Furthermore, as new capabilities are added to each tool over time, the incompatibilities between data models grow and change. Thus, the exchange of interoperable format media compositions is an inherently lossy process and may become more so over time as data models and native compositional formats diverge.

When an operator edits a first revision of a composition to generate a second revision, the changes between the two revisions can be captured in a change list. The change list generated from the originating application allows for individual commands to be executed in the receiving application to update the receiving application's composition which would have been initialized with the first revision of the composition. This change list approach is preferable to the alternative, in which the composition in the receiving application is overwritten with the second revision of the composition from the originating application because it preserves a record of the changes and allows previous revisions to be restored. The change list approach also has the advantage in that business logic in the receiving application may be used so as to apply the changes specified in the change list selectively on top of further changes that may been made by the editor using the receiving application. For reasons analogous to those that reduce the interoperable compositional format to the lowest common denominator, the vocabulary of operations captured by the change list does not allow for the full set of editing operations enabled by an individual creative tool. Thus, in these systems, the shared change list, referred to as a canonical change list, only contains changes that can be parsed and implemented by all of the creative tools being used to create and edit a media composition, and that support the canonical change list format. In a certain sense, canonical change lists may be viewed as the lowest common denominator, since they are limited to the types of changes that are supported by all the media editing applications.

In existing systems, the conversion from a native, rich format for a composition to an interoperable version is performed by the media creation and editing tools. Thus, each tool must be equipped with conversion software that complies with the interoperable compositional format standards. In addition, in many implementations, the applications must also convert change lists expressed in native, rich formats within the application, into the canonical format that is understood by multiple creative/editing applications. Thus, for each successive edit in a collaborative media creation project, the creative tools are required in order to generate an interoperable version for export and sharing, and, in some cases, to generate a canonical change list as well. This reliance on the creative tools can be burdensome since the tools are sophisticated and often costly. Furthermore, the inability to persist rich compositions or corresponding rich change lists independent of, i.e., outside the creative application, results in inflexibility and redundancies in the content management systems that store and manage the media compositions.

There is therefore a need to increase the flexibility and efficiency of collaborative media composition and editing by reducing the reliance on the creative/editing applications themselves for conversion of compositions and change lists from one format to another. There is also a need to reduce the inflexibility and redundancies in the content management systems that store and manage the media compositions.

SUMMARY

A general purpose difference engine uses a plug-in architecture to determine differences between two revisions of a media composition and generates and exports a change list that specifies the differences. The general purpose difference engine is able to identify the compositional format of a media composition, locate and install a compatible difference plug-in, as well as a compatible change list exporter plug-in module and a module that converts a native change list into a canonical form before exporting the change list. The incorporation of the change list determination and format conversion operations into the difference engine obviates the need to include such functionality into the various media editing applications themselves. A general purpose composition recreation engine also uses a plug-in architecture to recreate a revision of a media composition by applying changes specified in a change list to a prior revision of the composition. The composition recreation engine operates independently of media editing application used to create and edit the media composition.

In general in one aspect, a method of generating a difference between a first revision of a media composition and a second revision of the media composition includes: receiving at a media difference engine a first revision of the media composition and a second revision of the media composition, wherein the first and second revisions of the media composition are represented in terms of a first compositional data format that is a native format of a first media editing application, wherein the media difference engine, in response to receiving the first revision and the second revision of the media composition: locates and installs a difference plug-in software module corresponding to the first compositional data format; generates a native change list that specifies differences between the first revision of the media composition and the second revision of the media composition in terms of the first compositional data format; and exports the first revision of the media composition and the native change list.

Various embodiments include one or more of the following features. The second revision of the media composition was generated by editing the first revision of the media composition using the first media editing application. Storing the first revision of the media composition and the native change list in a database of a content management system. Enabling an operator using the first media editing application to: retrieve the first revision of the media composition and the native change list from the database of the content management system; and apply changes specified in the native change list to the first revision of the media composition to generate the second revision of the media composition represented in terms of the first compositional data format. The content management system further comprises a composition conversion software module; and using the composition conversion software module to convert the stored first revision of the media composition represented in terms of the first compositional data format into a first revision of the media composition represented in terms of an interoperable compositional format; and storing the first revision of the media composition represented in terms of an interoperable compositional format in the database of the content management system. The media difference engine in response to receiving the first revision and the second revision of the media composition further: converts the native change list into a canonical change list; locates and installs an export plug-in software module for exporting canonical change lists; uses the export plug-in software module to export the canonical change list from the media difference engine; and stores the canonical change list in a database of a content management system. The content management system includes a composition converter software module capable of converting a media composition represented in terms of the first compositional data format into a media composition represented in an interoperable format, further comprising: using the composition converter software module, converting the first revision of the media composition represented in terms of the first compositional data format into a first revision of the media composition represented in the interoperable format; and storing the first revision of the media composition represented in the interoperable format in the database of the content management system. Enabling an operator using a second media editing application different from the first media editing application to: retrieve the first revision of the media composition represented in the interoperable format and the canonical change list from the database of the content management system; and apply changes specified in the canonical change list to the first revision of the media composition represented in terms of an interoperable compositional format to generate a second revision of the media composition represented in terms of a second compositional data format that is a native format of the second media editing application. Enabling an operator using a second media editing application different from the first media editing application to: retrieve from a database of a content management system: the first revision of the media composition represented in an interoperable format; a canonical change list generated by converting the native change list into a canonical set of changes that may be implemented by a plurality of media editing applications including the first and second media editing applications; and apply changes specified in the canonical change list to the first revision of the media composition represented in the interoperable format to generate a second revision of the media composition represented in terms of a second compositional data format that is a native format of the second media editing application. The first media editing application is a non-linear video editing application. The second media editing application is a digital audio workstation. The first media editing application is a non-linear video editing application. The first media editing application is a digital audio workstation application. The first media editing application is a graphics application. The media composition is characterized by a first type, wherein the first type is one of a timeline type, a mixer configuration type, and a scene graph type. The media composition includes an element of a second type different from the first type. The first type is a scene graph type, and the second type is a timeline type.

In general, in another aspect, a method of collaboratively editing a media composition includes: enabling a first operator to use a first instance of a first media editing application to edit a first revision of the media composition to generate a second revision of the media composition, wherein the first instance of the first media editing application represents the first revision and the second revision of the media composition in terms of a first compositional data format; exporting the first revision and the second revision of the media composition from the first instance of the first media editing application; storing the first revision of the media composition in a database of a content management system; receiving the first revision and the second revision of the media composition at a media difference engine, wherein the media difference engine, in response to receiving the first revision and the second revision of the media composition: locates and installs a difference plug-in software module corresponding to the first compositional data format; uses the difference plug-in software module to generate a native change list that specifies differences between the first revision of the media composition and the second revision of the media composition in terms of the first compositional data format; and stores the native change list in the database of the content management system.

Various embodiments include one or more of the following features. Enabling a second operator using a second instance of the first media editing application to: retrieve the first revision of the media composition and the native change list from the database of the content management system; and apply changes specified in the native change list to the first revision of the media composition to generate the second revision of the media composition. The content management system further comprises a composition conversion software module; and using the composition conversion software module to convert the stored first revision of the media composition from the revision represented in terms of the first compositional data format into an interoperable compositional format. The media difference engine, in response to receiving the first revision and the second revision of the media composition further: converts the native change list into a canonical change list; locates and installs an export plug-in software module for exporting canonical change lists; uses the export plug-in software module to export the canonical change list from the media difference engine; and stores the canonical change list in the database of the content management system. Enabling a second operator using a second media editing application different from the first media editing application to: retrieve the first revision of the media composition in interoperable format and the canonical change list from the database of the content management system; and apply changes specified in the canonical change list to the first revision of the media composition in interoperable format to generate a conformed revision media composition represented in terms of a second compositional data format, wherein the conformed revision corresponds to the second revision of second revision of the media composition.

In general, in a further aspect, a method of retrieving a second revision of a media composition from a content management system includes: using a universal compositional recreation engine to retrieve from the content management system: a first revision of the media composition; a change list representing changes performed by an operator to create the second revision of the media composition starting from the first revision of the media composition; using the media composition recreation engine: determining a compositional data format of the first revision of the media composition; locating and installing a composition recreation software plug-in corresponding to the determined compositional data format of the media composition; using the composition recreation software plug-in to apply the change list to the first revision of the media composition to generate the second revision of the media composition; and exporting the second revision of the media composition.

Various embodiments include one or more of the following features. The compositional data format of the first revision and the second revision of the media composition is a format native to a first media editing application; and the change list is represented in terms of changes native to the first media editing application. The compositional data format of the first revision and the second revision of the media composition is an interoperable format; and the change list comprises changes expressed in canonical form.

In general, in another aspect, a computer program product comprises: a non-transitory computer-readable medium with computer-readable instructions encoded thereon, wherein the computer-readable instructions, when processed by a processing device instruct the processing device to perform a method of generating a difference between a first revision of a media composition and a second revision of the media composition, the method including: receiving at a media difference engine a first revision of the media composition and a second revision of the media composition, wherein the first and second revisions of the media composition are represented in terms of a first compositional data format that is a native format of a first media editing application, wherein the media difference engine, in response to receiving the first revision and the second revision of the media composition: locates and installs a difference plug-in software module corresponding to the first compositional data format; generates a native change list that specifies differences between the first revision of the media composition and the second revision of the media composition in terms of the first compositional data format; and exports the first revision of the media composition and the native change list.

In general, in another aspect a system comprises: a memory for storing computer-readable instructions; and a processor connected to the memory, wherein the processor, when executing the computer-readable instructions, causes the system to perform a method of generating a difference between a first revision of a media composition and a second revision of the media composition, the method comprising: receiving at a media difference engine a first revision of the media composition and a second revision of the media composition, wherein the first and second revisions of the media composition are represented in terms of a first compositional data format that is a native format of a first media editing application, wherein the media difference engine, in response to receiving the first revision and the second revision of the media composition: locates and installs a difference plug-in software module corresponding to the first compositional data format; generates a native change list that specifies differences between the first revision of the media composition and the second revision of the media composition in terms of the first compositional data format; and exports the first revision of the media composition and the native change list.

DETAILED DESCRIPTION

Media creation and editing applications enable their users to edit media compositions that draw upon various media sources, special effects, and metadata. During the course of editing, the original sources themselves are not altered, but the relationships between the sources, and the operations that act upon them are specified within the application to define the current state of the edited composition. In cases such as graphics, new procedurally generated content may be added and manipulated. The relationship among the data elements is specified in terms of a data model, which is unique to a given creative tool. Furthermore, the various creative tools use different compositional formats, which specify a structural layout of the data comprising a composition, even if their compositional data models are similar. Thus, compositions expressed in the format native to a given creative tool are opaque to another creative tool. When a media editing application is used to edit a media composition, the current state of the media composition is represented internally by the application in terms of various constructs of its native composition format.

Since the same applications are commonly used both to create media compositions from scratch and to edit existing media compositions, the terms "media composition application," "media creation application," and "media editing application" as well as "tool" instead of "application" may be used interchangeably. For purposes of clarity and consistency, such applications are referred to herein as media editing applications. The users of these applications may variously be referred to as editors, creators, or operators and may be used interchangeably herein.

Figure 1:
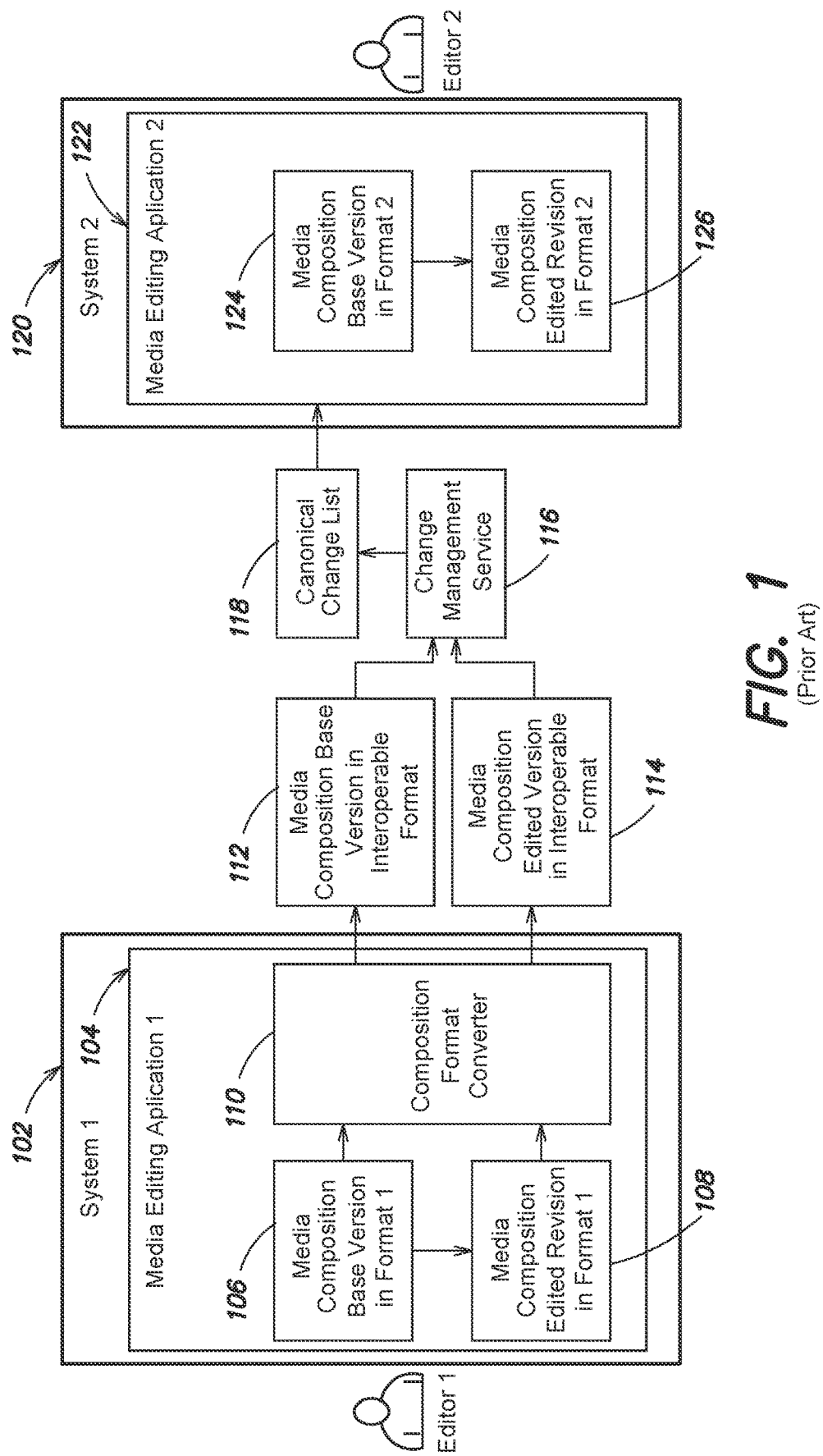
FIG. 1 is a block diagram showing a prior art method of collaborative media editing with different media editing applications using the export of interoperable format compositions.

As indicated above, current methods of collaborative media creation and editing rely on the exchange of interoperable format compositions and canonical change lists. There are two prior art methods of implementing such collaboration. Both of these methods rely on the media editing application to perform the conversion from the native format of the editing application to the interoperable format. FIG. 1 illustrates such a prior art method, in which system 1 102 hosting media editing application 1 104 is used by a first editor to edit base version 106 of the composition in the native format of the editing Application 1 to generate edited revision 108 of the composition, also in native format. Using internal composition format converter 110, the application converts the base version and the edited revision of the composition into corresponding compositions in interoperable format 112, 114. These interoperable format compositions are then imported into change management service 116 which is able to parse the interoperable format only and generate canonical change list 118. Since it only receives compositions in interoperable format, the change management service uses a standard, generic difference engine (not shown). Canonical change list 118 may then be imported into second media editing Application 2 122 hosted by system 120. Base version 124 in the native format of Application 2 may already be present in the second media editing application, in which case the canonical change list is used to generate edited revision 126 of the media composition in the native format of Application 2. If the base version of the media composition in native format 2 is not already present or accessible by media editing Application 2, interoperable format edited revision 114 may also be imported into the application, and the canonical change list may be applied to it. The process involves potential loss of information at two stages: first, at the composition converter where certain constructs of the native compositional format may not be supported in the interoperable format, and second when the change list between the two interoperable revisions is generated in canonical form, when certain changes may not be supported in the set of available canonical changes.

Figure 2:
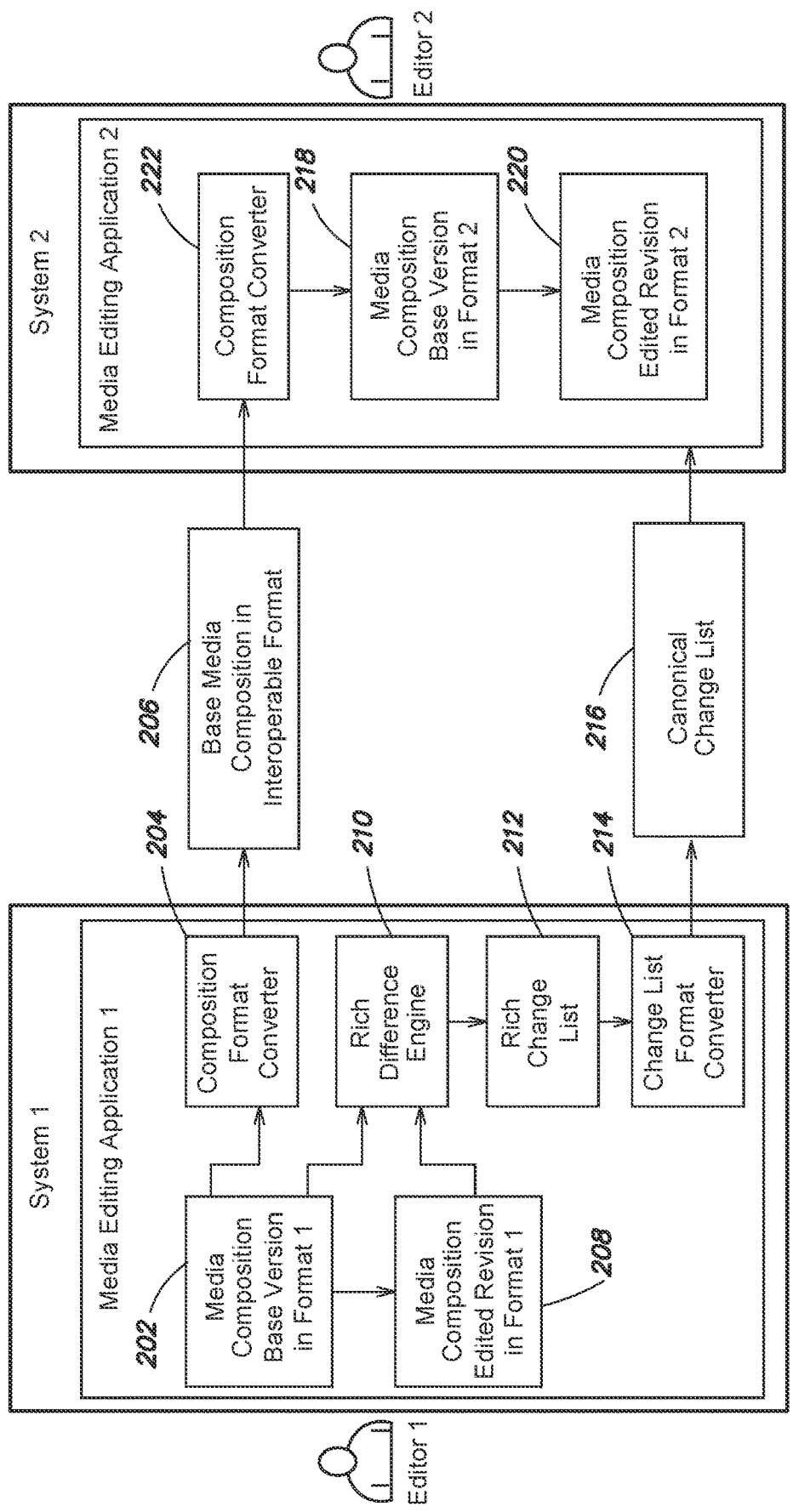
FIG. 2 is a block diagram showing a prior art method of collaborative media editing with different media editing applications involving the export of interoperable format compositions and canonical change lists.

FIG. 2 illustrates a second prior art method of implementing collaborative media editing. In this method, the media editing application is required to convert the native format composition to the interoperable format as well as to convert a rich change list to a canonical change list. Thus, base version in native format 1 202 is converted with internal format converter 204 to interoperable base version 206. In addition, the base version and edited revision 208 in native format 1 are compared by internal rich difference engine 210, which generates rich change list 212. The application uses its rich change list converter 214 to convert rich change list 212 into canonical change list 216. Application 2 may then import canonical change list 216 to update base version in native format 2 218 to generate edited revision in native format 2 220. As indicated in the figure, if Application 2 does not already have access to a base version of the composition, it imports interoperable format composition 206 and uses internal composition format converter 222 to convert it into the base composition in its own format. If base version in format 2 218 had previously been generated by Application 2, it may contain more information than the base version generated by the lossy process of converting to and from an interoperable composition format. Since a rich change list is expressed in terms of the constructs native to the editing application used to perform the editing, it is also referred to as a native change list. As used herein, the terms rich change lists and native change lists are used synonymously.

Note, because the canonical change list is a subset of the native change lists capturing all the changes between two native format compositions, each media editing application is able to parse and implement changes in the canonical list.

Figure 3:
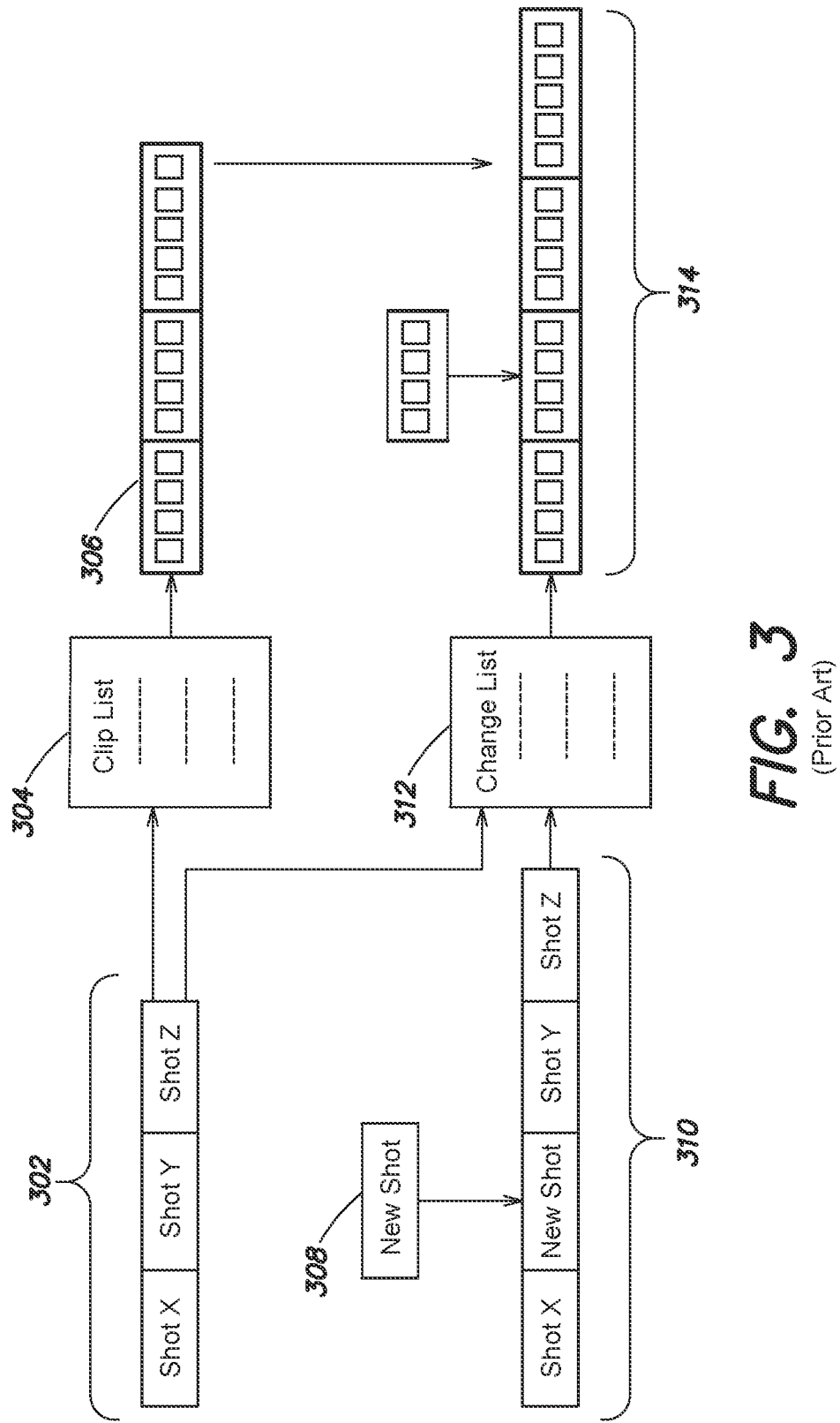
FIG. 3 illustrates the prior art use of change lists to conform a base version of a media composition to an edited version.

FIG. 3 illustrates the existing use of change lists in order to conform a composition to the current revision. The figure illustrates base composition 302 as represented within a first media editing application. The base composition is exported as clip list 304 containing the list of clips as well as duration and offset of the clips included within the timeline. The clip list may be imported into a second media editing application, which is used to generate copy 306 of the composition, which corresponds to composition 302. When changes are performed, such as by inserting new shot 308, the changes between edited revision 310 and base version 302 are captured in change list 312. The second media editing application updates or conforms its base composition 306 to edited revision 314 by applying the changes specified in change list 312. Successive changes may thus be propagated from one application to another via change lists.

In the methods described herein, the media composition conversion and difference list conversion are performed by an external difference engine which, via a plug-in mechanism, is able to operate as a single general-purpose or universal difference engine. The universal difference engine is a system that is able to accept revisions of compositions expressed in the native format of the media editing application from which it is received and use business logic within plug-ins associated with the media editing application type to make semantic sense of the changes between the revisions to create change commands that are native to the composition format for that application. In addition, the universal difference engine is also able to take the list of changes and express them in canonical change formats based on converter plug-in software modules. This enables the media editing applications themselves to be freed from composition format conversion tasks as well as change list conversions. As described below, this confers flexibility in the workflow, reduces the need to run media editing tools at every stage of a collaborative media editing project, and may also radically reduce media storage requirements in content management systems by allowing application-specific logic to define differences between revisions that can be stored along with a base version instead of storing full copies of each revision. As used herein, the term "universal" indicates that the difference engine may be used to find differences between compositions in any format for which a corresponding difference plug-in can be located and installed. In the absence of such plug-ins, the universal difference engine may not be able to determine the differences between two revisions of a composition. The word "universal" is used herein to distinguish such a difference engine from one that is "hard-wired," either internal to a media editing application or in an external application to determine differences and generate change lists only for a single pre-specified compositional format.

Figure 4:
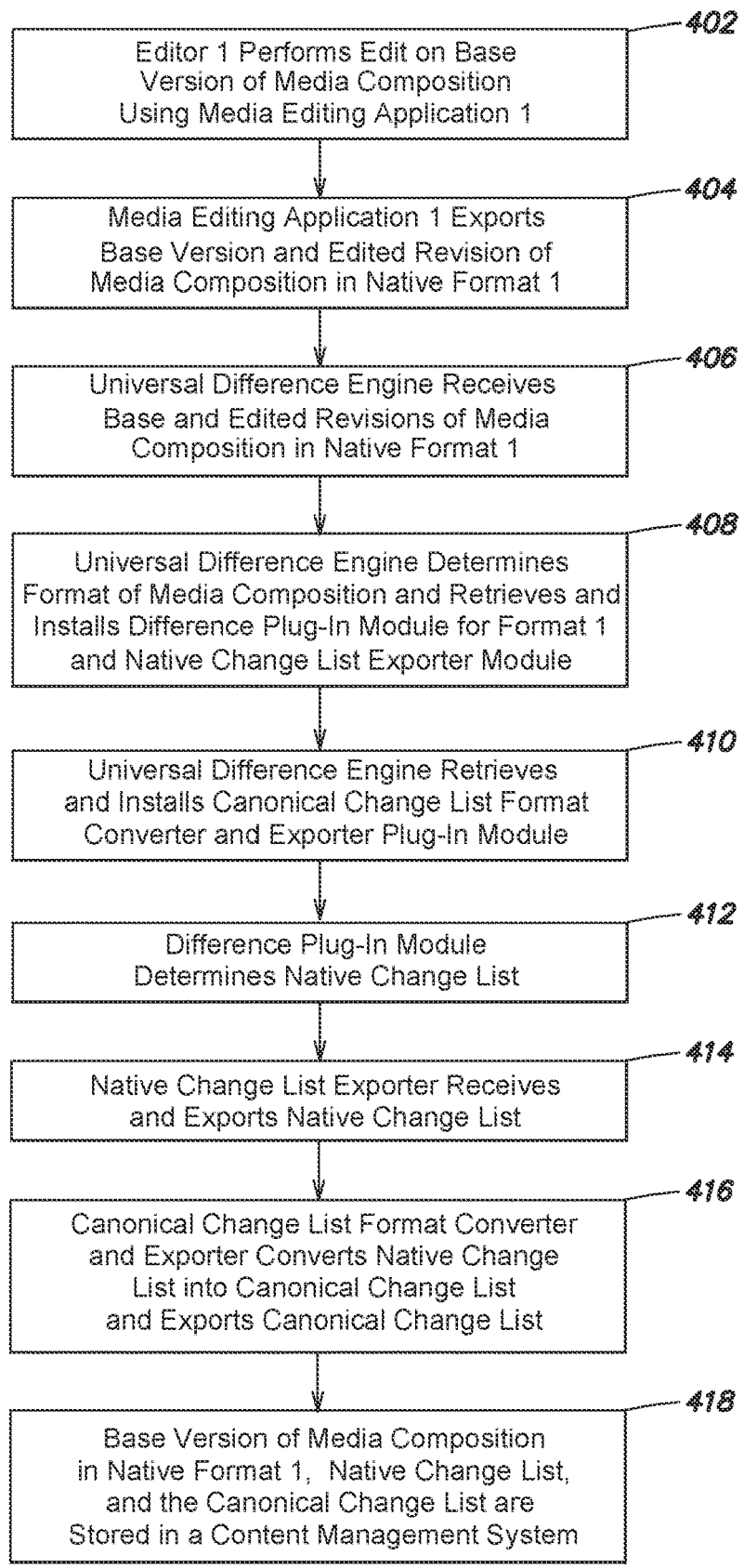
FIG. 4 is flow diagram showing the use of a universal difference engine for generating and storing change lists in a content management system.
Figure 5:
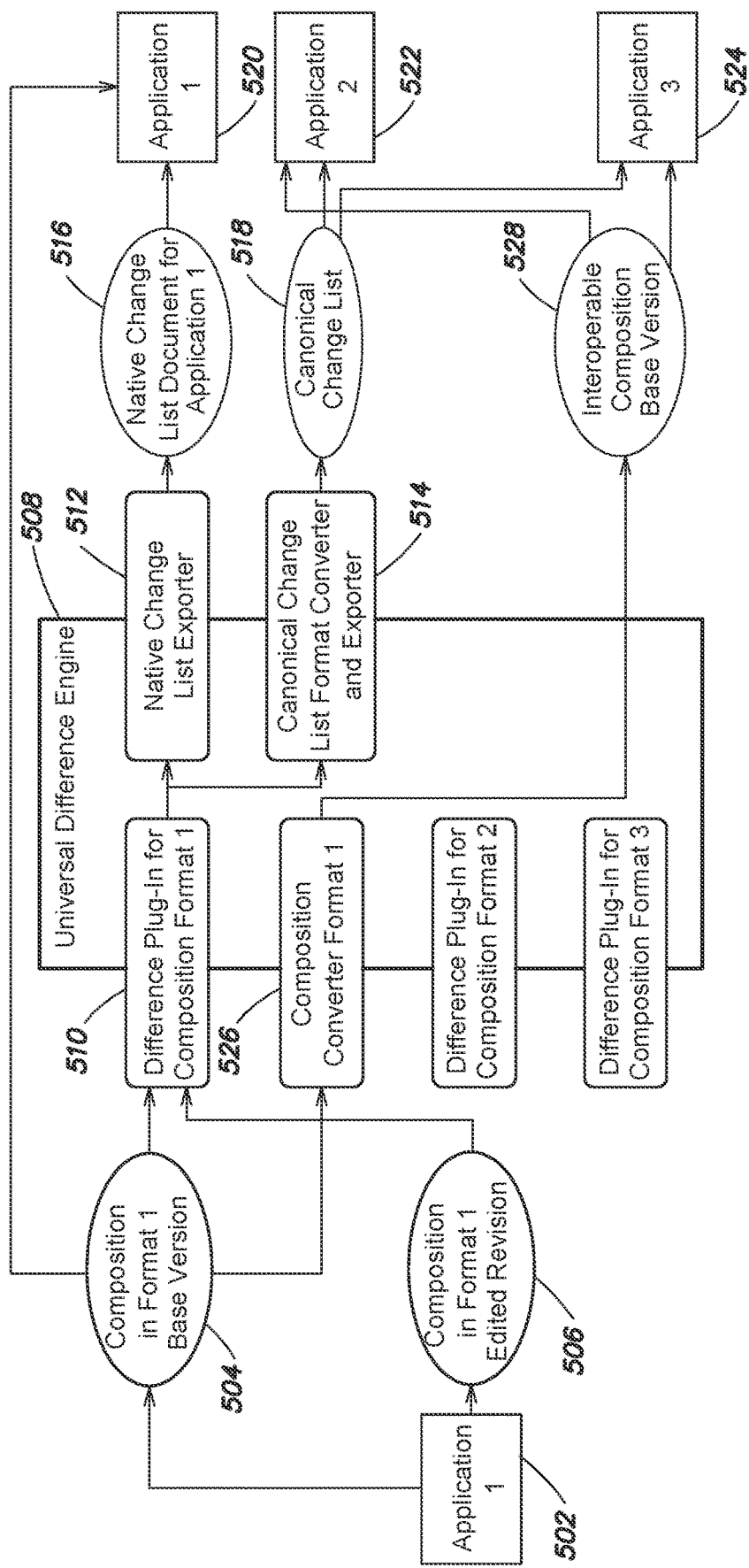
FIG. 5 is a block diagram showing the use of a universal difference engine for generating change lists and exporting compositions and change lists for use by multiple media editing applications having different native media composition formats.

FIG. 4 is a flow diagram showing the basic steps involved in the described collaborative editing methods and FIG. 5 is a corresponding high-level system block diagram. The collaborative editing may start with a first editor performing an edit on a base version of the media composition using a first media editing application (402) to generate an edited revision of the composition. Both the base version and the edited revision are represented in terms of the native composition format associated with the particular editing application. For example, the media composition may comprise video and/or audio, and the application may be one of a set of commercially available non-linear video editing applications such as Media Composer® from Avid® Technology, Inc., of Burlington, Massachusetts or a digital audio workstation such as Pro Tools® also available from Avid Technology, Inc. When the first editor wishes to make the edited revision available, the base version and the edited revision are both exported (404) in native format. FIG. 5 shows first application 502 and the exported base 504 and edited 506 revisions, both in native format, e.g., of Media Composer. The two exported versions of the composition are received by universal difference engine 508 (step 406). The universal difference engine determines the format of the received media composition, and then retrieves and installs difference plug-in software module 510 corresponding to the composition format (step 408). It also retrieves and installs two additional plug-in modules—native change list exporter 512 (step 408) and canonical change list format converter and exporter 514 (step 410). In the example given, the difference plug-in corresponds to the Media Composer composition format. Difference plug-in software module 510 parses media compositions in the format native to Application 1. It then generates the native change list that specifies the changes made to base version 504 to create edited revision 506 (step 412). Native change list exporter plug-in 512 receives the native change list and exports it from the universal difference engine, as document 516, which can persist independently of the universal difference engine or the media editing application (step 414). In addition, canonical change list format converter 514 receives the native change list, converts it into canonical form, and exports it as document 518, which can also persist independently of the difference engine or the media editing application (step 416). The change lists are now available for a second editor to use, either in native form when the second editor uses another instance of Application 1 520, or in canonical form when using another application, such as Application 2 522 or Application 3 524. Universal difference engine 508 may also retrieve and install composition converter plug-in 526. As with the difference plug-in module, the composition converter is specific to the editing application since it is able to parse the Application 1 composition format and convert it into an interoperable composition format. For a collaborative editing workflow, the composition converter converts base version of the composition in format 1 504 into base version of the composition in interoperable format 528. If further editing is to be performed using applications other than Application 1 which have different native formats, it is the base version in interoperable format that is imported by the other applications, and canonical change list 518 is used to update the base version to the edited revision in the native format of the other application, as indicated in FIG. 5.

As indicated above, the universal difference engine determines the particular choice of difference plug-in to locate, retrieve and install based on the format of the incoming compositions. In the scenario illustrated in FIG. 5, this is the format of base and edited compositions 504 and 506. The selection of the native change list exporter plug-in module (e.g., 512) is similarly determined by the incoming compositional format. However, the canonical change list format converter and exporter plug-in (e.g., 514) may be determined by the incoming compositional format as well the choice of the type of canonical change document required. For example, for video and audio compositions, the document may be a cut list, a columnar tabbed list, a web list, or an XML document.

In another use case, a content management system is used in which compositions and change lists are stored in a database. Media compositions are generally stored within content management systems in a variety of versions and revisions. As used herein, the different versions stored in a content management system reflect different deliverable end-products for a media composition, such as versions for specific target audiences, such as adult or family, different countries with their respective languages, different platforms, such as theatrical or streaming to a mobile device, a director's cut, and more. By contrast, each revision represents incremental changes made to a given version of a composition as part of the normal course of enhancing the composition over time. Thus, in general, subsequent edits render prior revisions obsolete, whereas the different versions of a composition exist in parallel, perhaps each with its own series of revisions. As used herein, a starting point for a given series of edits of a given version is referred to as a base version, with each subsequent edit producing a new revision of that version. The base version of a composition may be viewed as a revision too, as it may have been generated by a prior phase of editing on the same or a different platform. Thus, as used herein, a revision may refer to a base version as well as to a composition produced by editing the base version.

In many current content management systems, each of revision is stored in its entirety, which places heavy demands on content storage requirements since the full composition for each revision needs to be stored, as well as the source media it refers to. In an example, if a single video and audio composition for a one hour documentary has 60 unique individual clips that are associated with consolidated media encoded and stored in DNxHD 220 format, i.e., video compressed to a bit rate of 220 megabits per second, and PCM audio codecs, then a revision stored in a content management system may consist of approximately 100 GB of media and approximately 5 MB for the composition. If a new revision of the composition consists of a single one-minute clip added to the composition, without the inclusion of information specifying the difference between the revisions, the new revision of the composition sent to the content management system would have to duplicate the composition storage, and in some cases even duplicate the referenced media content for that new revision, resulting in approximately 200 GB of content storage. By contrast, if the content management system could obtain a difference between the two revisions, it would identify that the only change in the composition is the one-minute clip addition. With that information, the content management system may now keep the original 105 GB of composition and media, but only add another 1.7 GB corresponding to the individual one-minute clip that was added as the new clip, and a fraction of the 5 MB composition for the associated change list that indicates the addition of the one minute clip in the composition. Thus, storage requirements can be radically reduced by storing a limited number of revisions of the full composition, and instead of storing other complete revisions of the media compositions themselves, storing a change list for each revision that specifies what has changed between a base version of the composition and that revision. When a particular revision is needed, the changes specified in its corresponding change list are applied to the base version. This process of applying the change list may be performed without the need for the media editing application itself, as described below. Through the multiple generations of creating new revisions, the change lists associated with a new revision retain a reference to the previous revision to serve as a base for that new revision.

Figure 6:
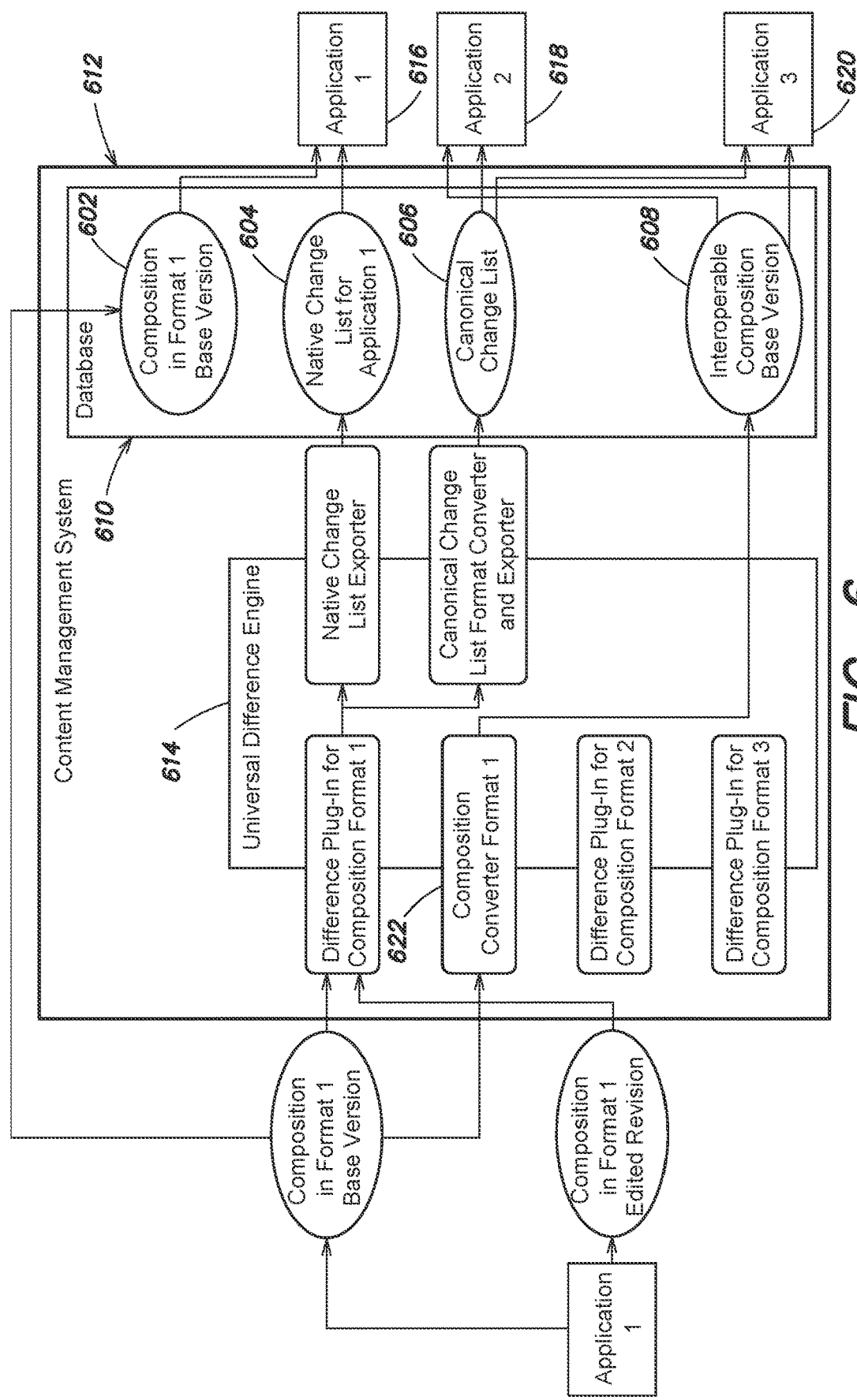
FIG. 6 is a block diagram showing the use of a universal difference engine for generating and storing change lists in a content management system and the export of compositions and change lists for use by multiple media editing applications having different native media composition formats.

The use of a universal difference engine in conjunction with a content management system is illustrated in FIG. 6. Base version of the media composition in native format 1 602, format 1 native change list 604, canonical change list 606, and base version of the composition in interoperable format 608 are stored in database 610 of content management system 612 (step 418). The content management system may be hosted in the cloud, or on a server in network communication with each of the systems hosting the edited applications. Universal difference engine 614, together with the various plug-in software modules that it has instantiated, are also a part of content management system 612.

Figure 7:
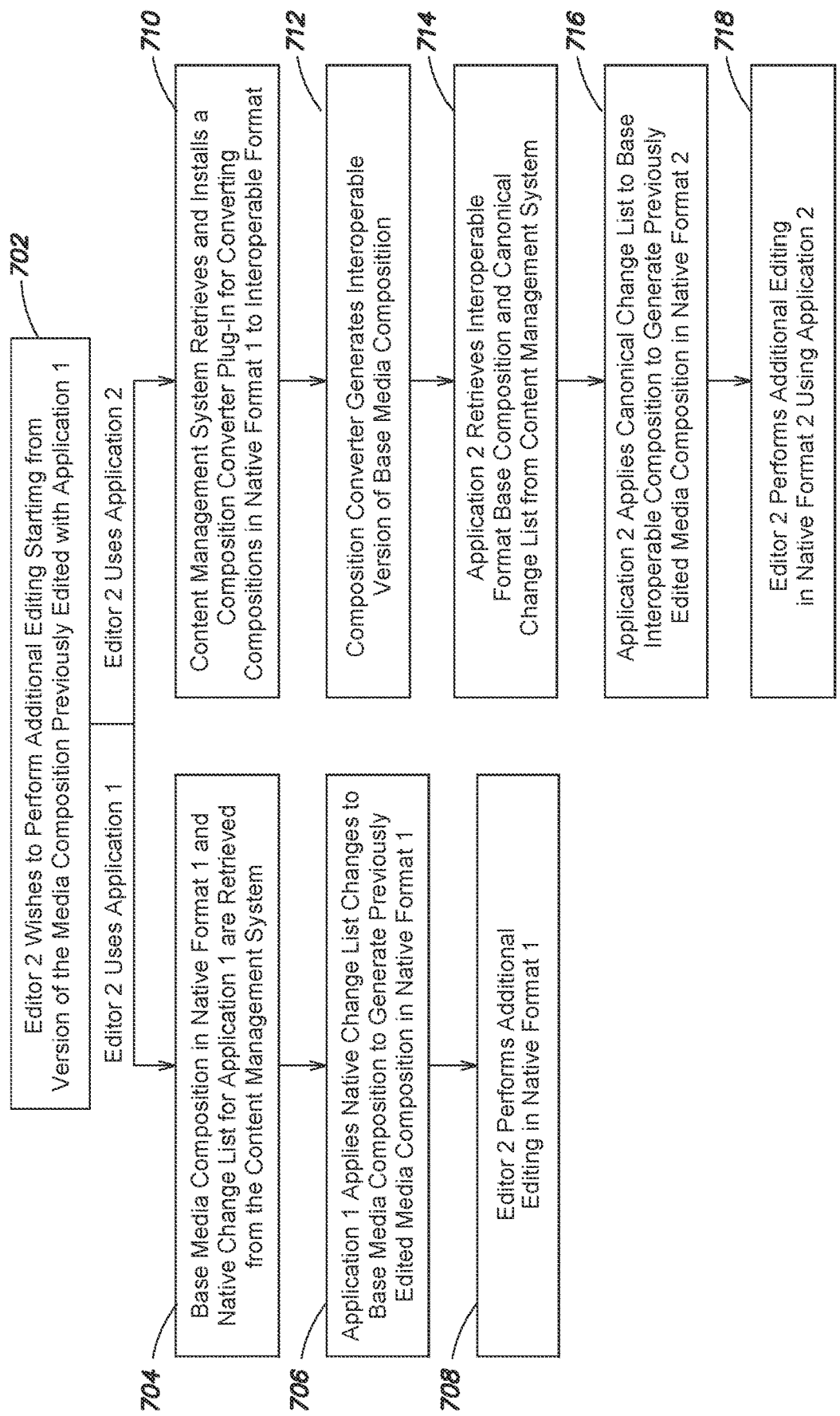
FIG. 7 is a flow diagram showing steps involved when an operator performs additional editing of a previously edited media composition.

FIG. 7 is a flow diagram showing the main steps involved when an editor wishes to perform additional editing on the media composition (step 702). If further editing is to be performed by an editor using Application 1 616, the application retrieves from the content management system native format base version 602 and native change list 604 (step 704). Application 1 applies the changes specified in the native change list to the edited revision of the composition in its native format with no loss of information (step 706), and the second editor is then able to proceed with additional editing, starting from the previously edited revision (step 708). In various implementations, the second editor need not apply all the changes contained in the change list but select the ones desired "a-la-carte." Note, the continued editing may also be performed by the same editor who performed the initial edit, using either the same instance of the editing application or another instance running on a different system. If, on the other hand, further editing is to be carried out using another media editing application, such as Application 2 618 or Application 3 620, interoperable revision 608 of the base composition is needed. If this is not already present in the database, the content management system retrieves and installs composition converter plug-in module 622 corresponding to the Application 1 native format (step 710). The converter module then converts the base version of the composition from native format 1 602 to interoperable format 608 (step 712) and stores it in the content management system. The application (e.g., Application 2) then retrieves base version of the composition in interoperable format 608 and canonical change list 606 from the content management system (step 714). It next applies the canonical change list to the base interoperable revision to generate the previously edited media composition in its own native format, albeit with some loss of information accompanying the conversion of the composition into interoperable format and conversion of the change list into canonical form (step 716). As with the native case mentioned above, the second editor may choose to apply some or all of the changes in the canonical change list. The second editor may then proceed to perform additional editing in the new native format using the second application (step 718).

Thus, in effect, the database supports two versions of the composition—the base version and the edited version, i.e., the revision, but only stores a single composition in full, i.e., the base version. As mentioned above, since a media composition occupies much more storage than a change list, there is a considerable saving of storage space as compared to storing both versions of the composition in full. Furthermore, since the database stores the composition in a native format as well as in an interoperable format, and the change list in native form as well as in canonical form, the composition can be further edited starting from its previously edited state by using the same application that performed the previous edit, with no loss of information, or by using a different application, though with some attendant loss of information.

In a common use case, the various media editing applications being used to collaboratively create a given composition may have last been updated with different revisions of the composition, with some applications having a revision that may have been subsequently edited one or more times. In order to accommodate this situation, the content management system may store a series of change lists, each of which specifies the changes made from one revision to an immediately succeeding revision. Thus, if there have been n revisions of a composition during the course of editing starting from a base version, the content management system may store the base version and n change lists, i.e., a first change list that specifies the changes from the base to revision 1, a second change list that specifies the changes effected between revision 1 and revision 2, etc., up to the change list between revision n-1 and revision n. When an operator of a media editing application wishes to update the composition from whatever state it is in the locally stored revision to the current revision, the system retrieves just the one or more change lists that, when applied sequentially, will update the composition to the current state, i.e., the $n^{th}$ edited revision.

Figure 8:
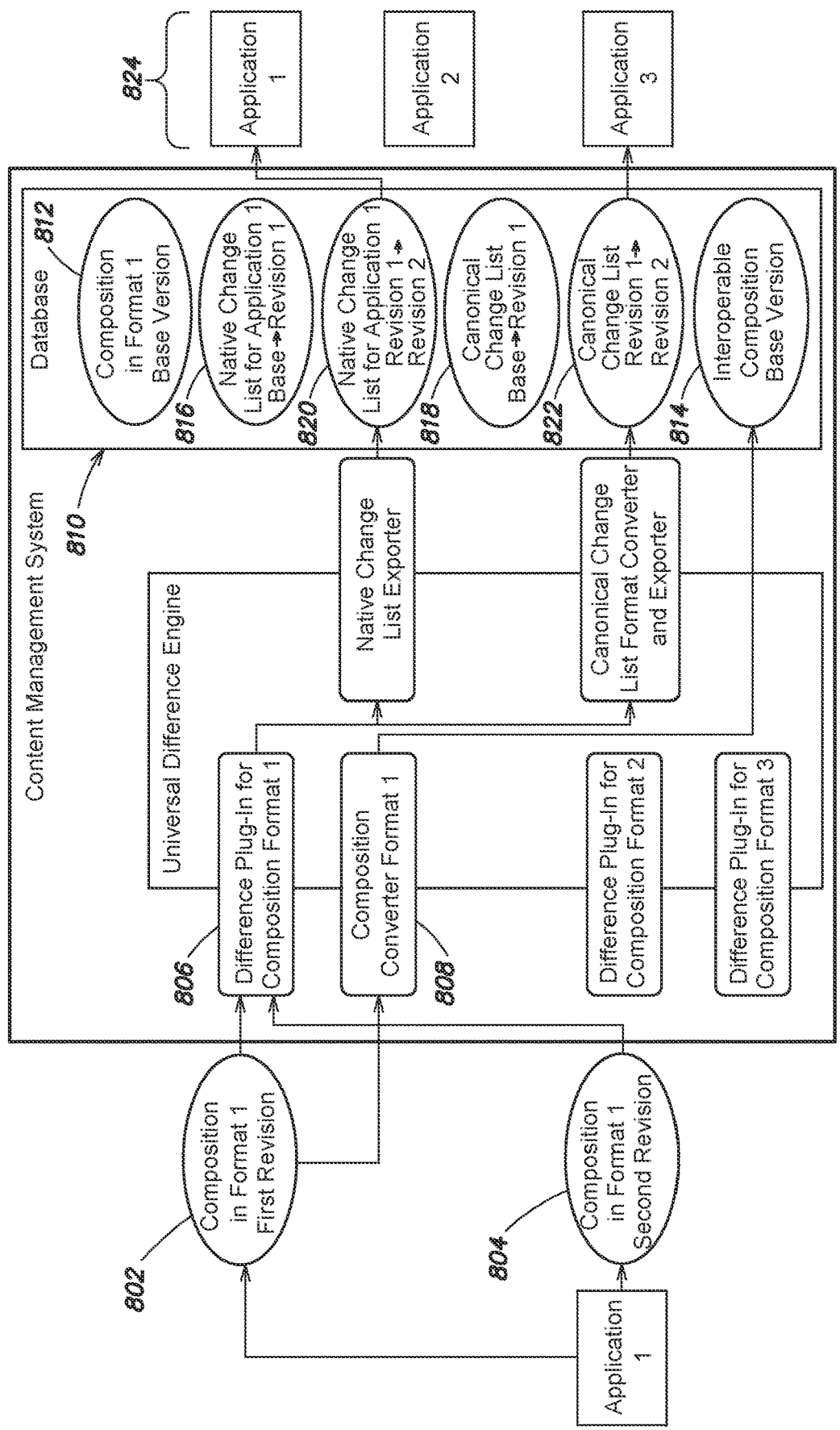
FIG. 8 is a block diagram showing the method of FIG. 6 with the storing of multiple change lists in the content management system.

FIG. 8 illustrates the storage of multiple change lists, each specifying the changes between a given revision of the composition and the subsequent revision generated by editing the given revision. The figure includes a second editing cycle in which an operator edits a first revision to generate a second revision. The application exports first revision 802 and second revision 804. Difference engine plug-in 806 and composition converter 808 function in the same way as described for the base version editing case illustrated in FIG. 6. The result is that content management system database 810 stores the composition base version in native format 812 and in interoperable format 814, but in addition to native change list 816 and canonical change list 818 specifying the changes between the base version and the first revision, it stores the native change list 820 and canonical change list 822 specifying the changes between the first revision and the second revision. Receiving applications 824 are now able to update their locally stored copies of the composition with the second change list only, or with both the first and second change list, depending on whether the receiving application local composition copy was the base version or the first version respectively. The figure shows the case where a second instance of Application 1 may be used for further editing after receiving native format change list 820 (assuming its local copy has already been updated to revision 1). It also illustrates the use of Application 3 for further editing, and since this application has a different compositional format from Application 1, it receives canonical change list 822 (assuming it too has already been updated to revision 1).

It may be desirable to avoid the need for having an installed copy of a media editing application when conforming a base version of a composition to an edited revision using a change list. This may be accomplished by means of a universal composition recreation engine, which has a plug-in architecture similar to that of the universal difference engine. In various implementations it is also implemented as part of a content management system. The composition recreation engine recreates a revision of a composition by applying a change list to a prior revision of the composition. In various use cases, it may also be used to recreate a version of a composition (i.e., a deliverable) by applying a set of changes to a base, or master version of a composition. As used herein, a universal composition recreation engine refers to a composition recreation engine that is able to recreate a composition having a composition format corresponding to an available composition recreation plug-in software module. Thus, if no such module is available for a particular format, the recreation engine may not be able recreate compositions in that format. As for the universal difference engine described above, the term "universal" indicates a general purpose composition recreation engine that contrast to a hard-wired engine that is adapted specifically to a particular native or interoperable format.

Figure 9:
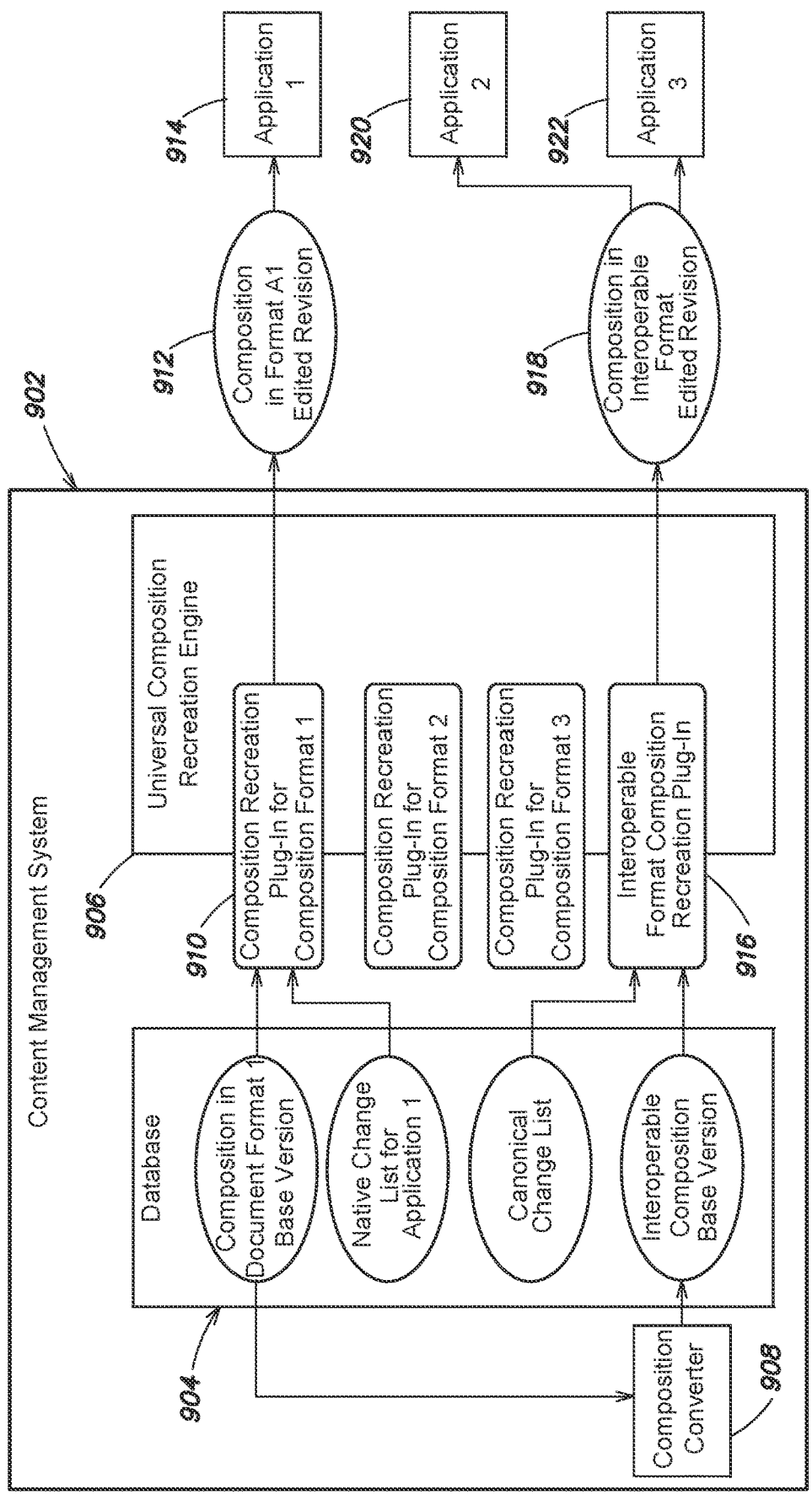
FIG. 9 is a block diagram showing the use of a universal composition recreation engine for generating edited revisions of a composition from a base version and a change list without the use of a media editing application.

The universal composition recreation engine is illustrated in FIG. 9, which is a high-level block diagram of the main elements. Content management system 902 includes database 904 and universal composition recreation engine 906. It may also include composition converter 908. The database contains stored copies of the base version of the composition in native format 1 and interoperable format. It also contains the change list between the base version and an edited revision, with the change list stored both in native form and canonical form. If an edited revision of the composition is needed in native format 1, composition recreation engine 906 retrieves the base version of the composition in native form and determines its format. If a plug-in corresponding to the format of the base version is not already installed, the composition recreation engine locates, retrieves, and installs composition recreation plug-in software module for format 1 910. The module is able to parse the composition in native form, apply the changes specified in the native form change list, and export the edited revision of the composition in native format 1 912. This may then be imported by an instance of Application 1 914 for further editing. Thus, the conform step is performed by the universal composition recreation engine, not by the application itself. On the other hand, if an edited revision of the composition is needed in interoperable format for use with applications having a different composition format, the universal composition recreation engine imports the interoperable base version of the composition as well as the canonical change list from the database, implements the changes to the interoperable base version, and using interoperable format composition recreation plug-in 916, applies the canonical change list to the interoperable base version and exports the edited revision of the composition 918 in interoperable format. This edited revision may be used as the starting point for further editing by editors using other applications, such as Application 2 920 and Application 3 922. The recreation operation performed by the plugin to recreate an edited version can be run iteratively for any new change lists corresponding to further revisions where the plugin incrementally applies the changes of each change list starting from the base version.

The data models and the compositional formats based on them each belong to a high-level type that defines the type of media composition being edited. Types of media composition include timeline compositions, audio mixer strips, and graphics compositions which are typically represented as scene graphs. Scene graphs specify relationships between procedurally generated graphics objects that are related to each other in terms of relative placement, common transformation, animation timing, and material properties, that are all used together to determine a rendered output of a scene. Mixer strips are typically associated with audio compositions where various audio sources may be associated with their own audio faders and positional and other audio effect parameters before being combined together into an audio mix.

Video and audio compositions are examples of timeline-type media compositions. The semantic entities belonging to timeline-type compositions include sources, clips, and tracks. When a timeline-type composition is edited, the changes are expressed in terms of operations on these entities. The vocabulary for timeline type change lists includes but is not limited to: delete, insert, insert head, insert tail, delete tail, delete head, delete middle, move, slip, slide, short cut, jump cut, fade out, fade in, dupe, dissolve, optical, optical media, and media offline. The objects that define a mixer configuration-type composition include the number of mixer strips, fade parameters, and channel routing. Operations for mixer configurations include insert, effect, send, return, parameter change, create, delete, and connect. Scene graph compositions are represented in terms of layers, parent-child relationships between objects, and transformation parameters. Semantic entities for scene graph compositions include lights, camera, objects, positions, rotations, coordinate system origins, animation time, and motion paths. The corresponding operations include scale, rotate, translate, trim head of span, trim end of span, create, delete, and insert. Computer-generated graphics, whether still or animated, involve the use of scene graph compositions. Mixer configuration-type compositions and scene graph-type compositions also include their own set of operations with a corresponding vocabulary that is used to express changes specified within change lists. Certain media compositions may include elements of more than one type. As an example, a digital audio workstation composition typically includes a timeline-type element as well as a mixer configuration-type element. In some implementations, a digital audio workstation composition may include object-based mixing, featuring 3D positional operations such as 3D panning, which correspond to elements and operations of scene graph-type compositions. Such "hybrid" compositions are discussed in more detail below.

As indicated above, multiple creative applications that enable compositions of a given type to be edited each have their own compositional format, and thus compositions in native format for one application are not, in general, readable by another application. Thus, for example, two different non-linear video editing applications such as Media Composer from Avid Technology and Adobe® Premiere® from Adobe Inc., of San Jose, California, each use timeline-type data models that include references to sources, clips, and tracks, but the way in which these objects are referenced and assembled into a composition is specific to each application. The same situation prevails with applications used to edit mixer configuration-type compositions. Thus, two different digital audio workstation applications, such as Pro Tools from Avid Technology, Inc., and Logic® from Apple Inc. of Cupertino, California both base their respective data models on mixer strips, fade parameters, and channel routing, but implement them in different ways such that native compositions of one application are opaque to the other. A similar lack of compatibility pertains with the graphics applications and their scene graph-type compositions. Examples of scene graph creative tools include Avid Maestro® Designer™ and Autodesk® Maya®.

Figure 10:
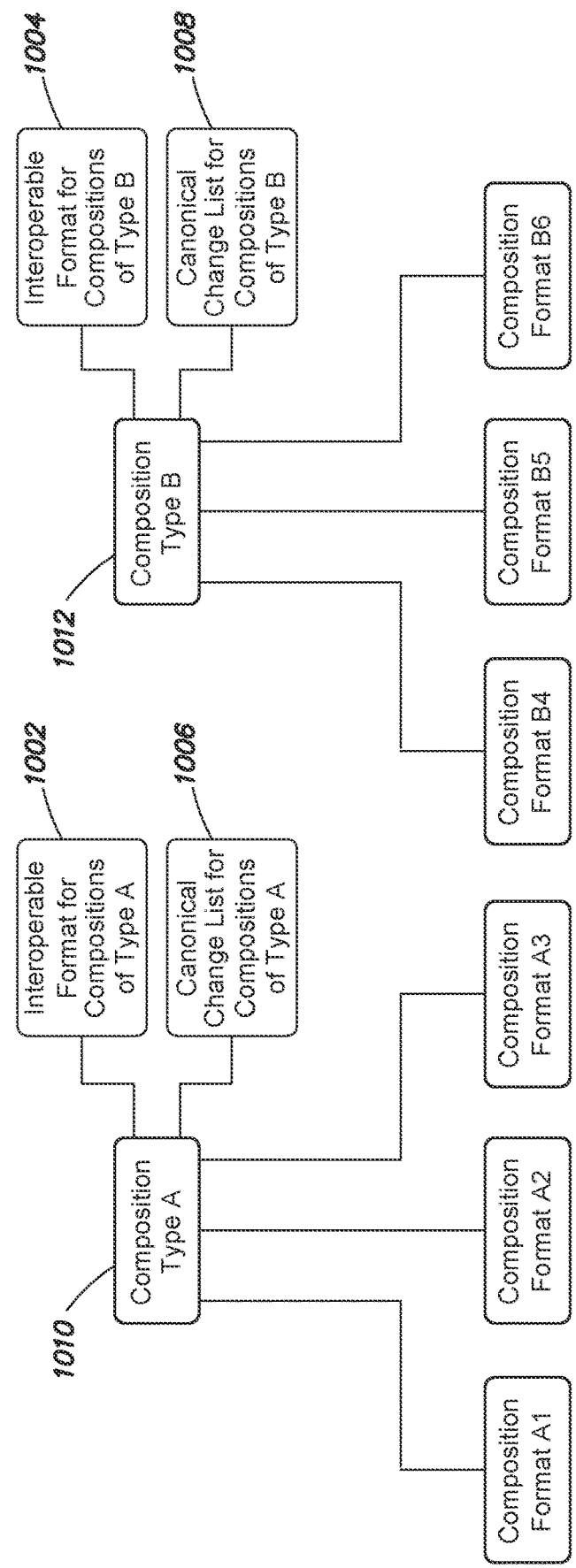
FIG. 10 is a block diagram illustrating interoperable composition formats and canonical change list formats for compositions of different types.

The collaborative editing methods described herein may be used to create and edit any type of composition, i.e., timeline-type, mixer configuration-type, and scene graph type. As shown in FIG. 10, a separate interoperable composition format (1002, 1004) and a separate canonical change list format (1006, 1008) is used for each composition type (1010, 1012), representing the changes in the semantic entities included within the corresponding composition type in a canonical form.

Figure 11:
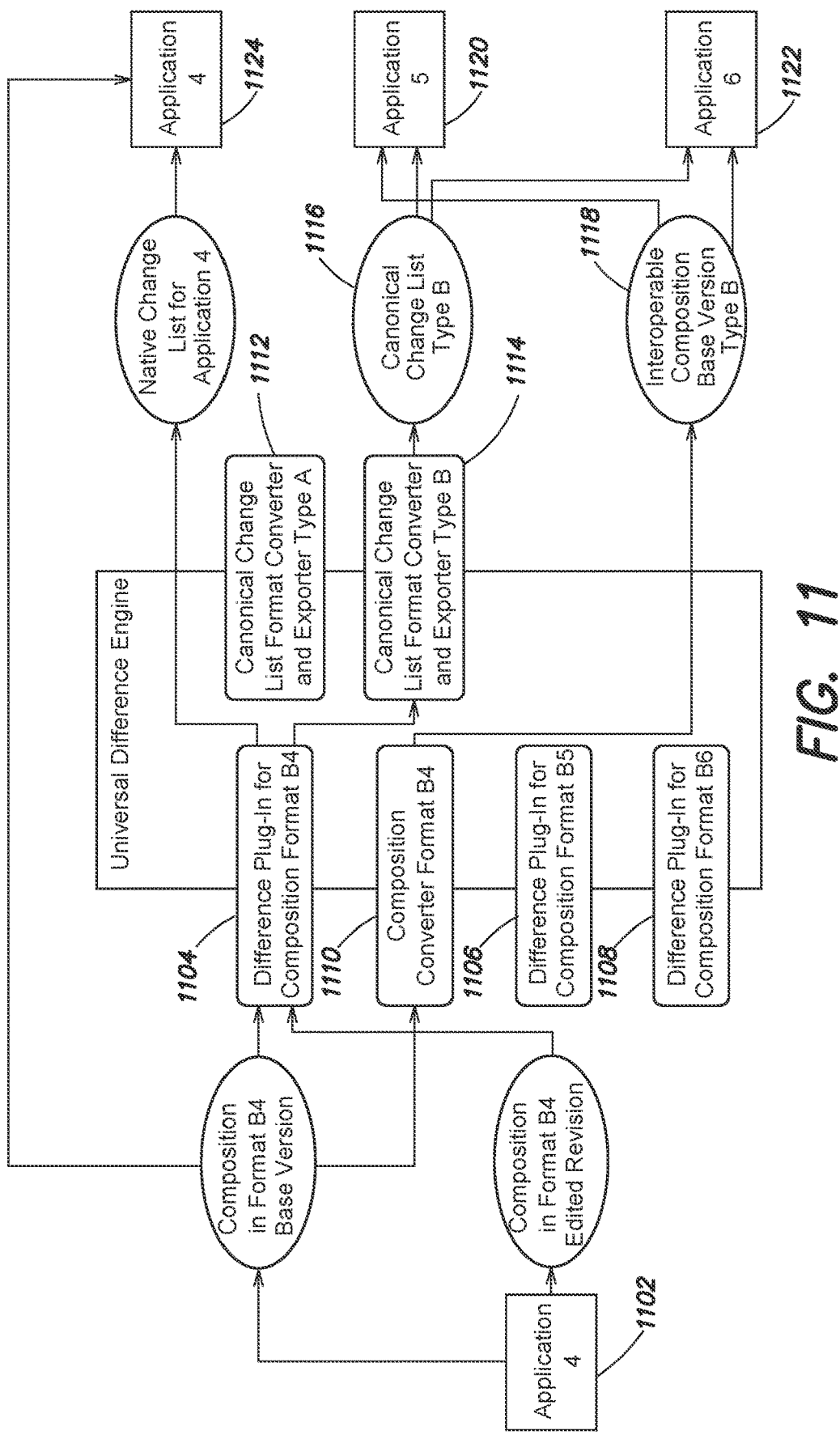
FIG. 11 is a block diagram showing the use of the described collaborative media editing methods with documents of a given type.

FIG. 11 illustrates the application of the methods to documents of a given type (shown as Type B in the figure). In general, the difference and converter plug-ins invoked by the universal difference engine may be defined by their type as well as by the specific format of a media editing application of that type. Thus, Application 4 1102 is a tool for editing documents of Type B, and the native format specific to this application is designated as format B4, specifying both its type and the specific instance of the composition format of this type. Accordingly, difference plug-ins 1104, 1106, 1108 are each specific to both the type (i.e., B) and the specific instance a composition format of this type (i.e., B4, B5, and B6 respectively). Composition converter 1110 also corresponds a specific composition type and instance, i.e., B4. On the other hand, canonical change list exporters 1112 and 1114, canonical change list 1116, and interoperable composition 1118 are generic to the type, i.e., Type B, and may be imported into any application for editing compositions of Type B, such as Application 5 1120 and Application 6 1122, or a second instance of Application 4 1124. As with the systems illustrated above in FIGS. 5 and 6, the universal difference engine locates, retrieves, and installs native change list exporter plug-in software modules, which are omitted in FIG. 11 for purposes of clarity.

Figure 12:
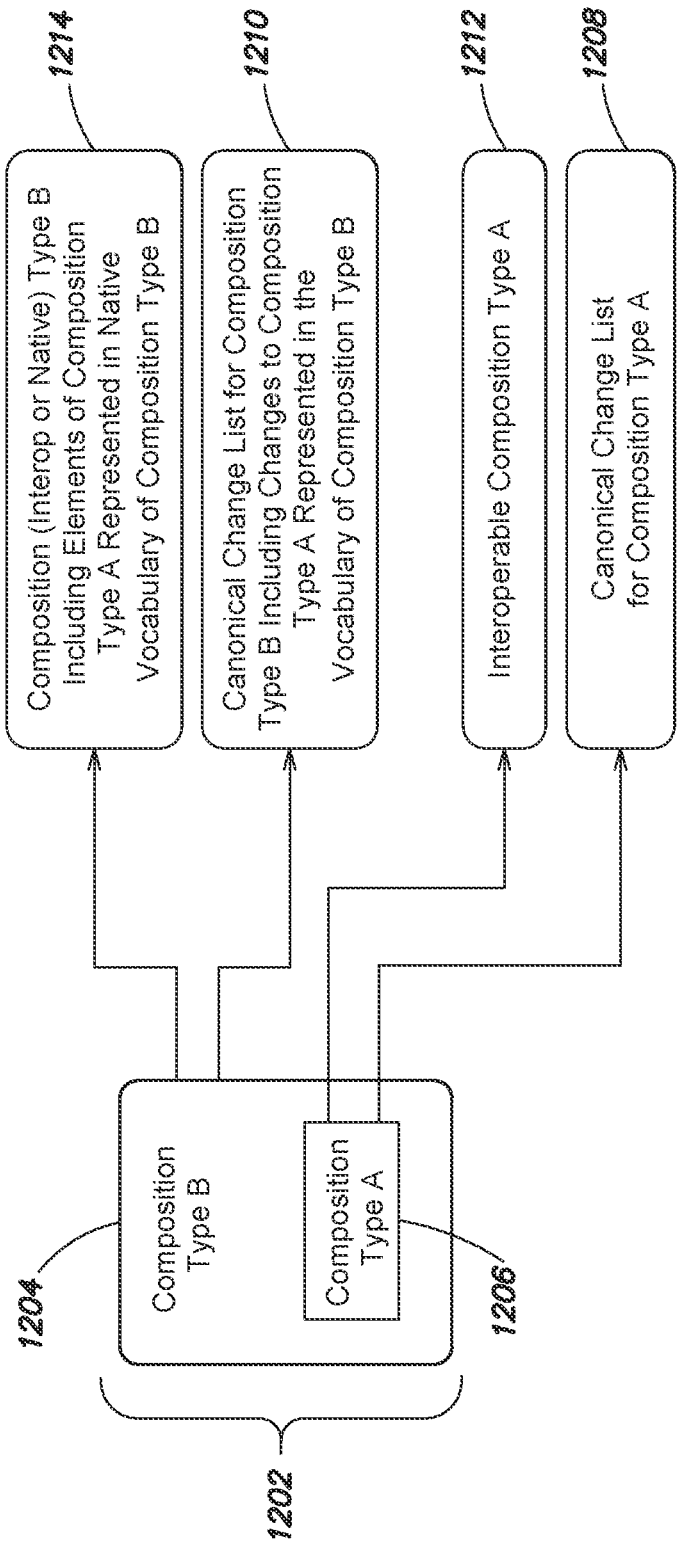
FIG. 12 is a block diagram illustrating a hybrid composition and the native and interoperable compositions and change lists associated with it.

As mentioned above, compositions may be hybrid, having elements of more than one type within them, as illustrated in FIG. 12. For example, a scene graph may contain a timeline element within it. The timeline element may be used to define a temporal span for which an object in the scene graph is to be made visible or it may be used to define a temporal span during which an element of the scene graph is animated. Changes to a span can be transported to an application for editing a different composition type, for example to a timeline-type composition editing application. The timeline-type application may make changes to the spans, and the edited timing information may be returned within a change list to the scene graph-type composition editing application, where it is applied to the timeline objects within a scene graph composition. In one use case, such a workflow may be used to implement visual effect timing; a visual effects editor adjusts temporal spans without the need to use a scene graph-type application. The edited temporal spans may then be incorporated into timeline elements of the scene graph composition by the scene graph editing application without affecting the scene graph-type objects.

The transfer of editing changes from a hybrid composition using a media editing application for compositions of a first type to a media editing application of a second type is illustrated in FIG. 12. Hybrid composition 1202 consists of composition Type B 1204 containing element 1206 of Type A. In this case, two canonical change lists may be generated—canonical change list for a document of Type A 1208 and canonical change list for a document of Type B 1210 as well as interoperable compositions of Type A 1212 and Type B 1214. Native format change lists for each of the document types may also be generated. Interoperable Type B composition 1214 includes elements of composition Type A represented in the vocabulary of composition Type B. Similarly, Type B canonical change list 1210 includes changes to the Type A compositional element represented in the native change list vocabulary of a composition of Type B. The change lists can be in formats that are native to a particular destination application or in canonical change list format.

Figure 13:
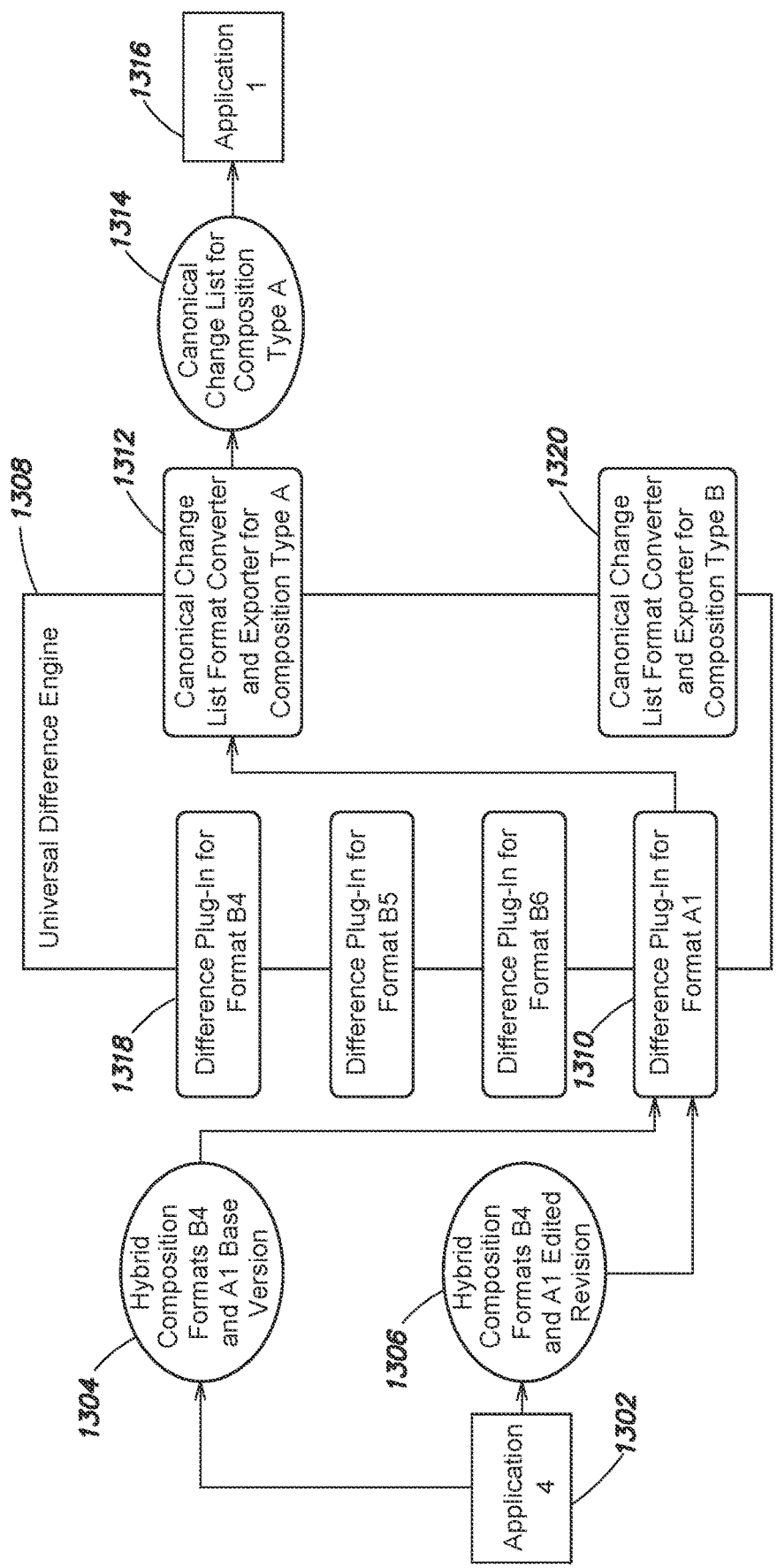
FIG. 13 is a block diagram illustrating a use case of the described collaborative editing methods with a hybrid composition.

FIG. 13 illustrates a use case scenario in which an application for editing documents of a given type is used to edit a hybrid document. Application 4 1302 is an editing application for compositions of Type B, and it is used to edit hybrid composition base version 1304 to generate edited revision 1306. The hybrid composition is of type B4 and contains one or more elements of type A1. Although Application 4 is a composition Type B editing application, it is able to edit certain parameters pertaining to its Type A elements. The type of change is determined by universal difference engine 1308, which retrieves and installs difference plug-in software module 1310, which corresponds to the format of the element that has been edited, i.e., A1. Plug-in 310 determines the changes and uses Type A canonical change list format exporter plug-in module 1312 to export canonical change list for Type A compositions 1314, which specifies the changes made to the Type A elements within Type B composition 1304 to generate edited revision 1306. The changes may be imported into Application 1 1316, which is a composition Type A media editing application. There, further changes may be performed by an operator familiar with Type A editing applications, who may not be familiar with Type B composition editing applications. The changes may then be captured as an additional change list of Type A (not shown) and imported back into a Type B composition editing application where the changes are implemented, i.e., conformed. As described above, a use case for such hybrid composition editing concerns the timing of visual effects within a scene graph composition. As with FIG. 11, the universal difference engine also locates, retrieves, and installs the corresponding native difference plug-in software module 1318 as well as native change list exporter plug-in software module, which is omitted in FIG. 13 for purposes of clarity and canonical change list format converter and exporter for composition Type B 1320.

When multiple editors are editing a single composition, conflicts between the edits performed by different editors may arise. Methods of conflict management include locking various portions of a composition or flagging conflicts for an editor to determine which changes is to take precedence. Alternatively, conflicting changes may be discarded, and an earlier revision of a composition restored.

When different editing applications perform changes on elements of a hybrid media composition having different elements, the change lists may be applied sequentially since a change to an element of one type does not affect elements of other types. For example, if a timing change is performed to a hybrid document with a non-linear video editing application, and a digital audio workstation is used to change a mix configuration of the hybrid composition, then the changes may be applied independently of each other in any desired order. When the changes involve elements of the same type, conflicts are avoided by locking elements of the composition, though a locked element of a given type may still be able to accept changes to the composition of a different type that may affect the locked elements without creating a conflict. Other methods of conflict management are similar to those deployed for single-type compositions, including locking portions of the composition, flagging potential conflicts for manual resolution, and reverting to an earlier revision of the composition.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of generating a difference between a first revision of a media composition and a second revision of the media composition, the method comprising:

receiving at a media difference engine external to a first media editing application a first revision of the media composition and a second revision of the media composition, wherein the first and second revisions of the media composition are represented in terms of a first compositional data format that is a native format of the first media editing application, and wherein the media difference engine, in response to receiving the first revision and the second revision of the media composition:

locates and installs a difference plug-in software module corresponding to the first compositional data format;

generates a native change list that specifies differences between the first revision of the media composition and the second revision of the media composition in terms of the first compositional data format;

exports the first revision of the media composition and the native change list; and locates and installs:

a composition converter software plug-in module corresponding to the first compositional data format; and a change list converter and exporter plug-in software module corresponding to the first compositional data format; and uses the composition converter software plug-in module to convert the first revision of the media composition in the first compositional data format into an interoperable compositional format and to export the first revision of the media composition in interoperable format; and uses the change list converter and exporter plug-in software module to convert the native change list into a corresponding canonical change list and to export the canonical change list from the media difference engine.

2. The method of claim 1, further comprising enabling an operator of a second media editing application having a second compositional data format that is different from the first compositional data format to:

import the first revision of the media composition in interoperable format and the canonical change list; and apply at least a portion of the canonical change list to the interoperable format media composition to generate a second revision of the media composition in the second compositional data format, wherein the second revision of the media composition in the second compositional data format reflects at least some of a set of changes applied to the first revision of the media composition in the first compositional format to generate the second revision of the media composition in the first compositional data format.

3. The method of claim 2, wherein the first media editing application is a non-linear video editing application, and the second media editing application is a digital audio workstation.

4. A method of generating a difference between a first revision of a media composition and a second revision of the media composition, the method comprising:

receiving at a media difference engine external to a first media editing application a first revision of the media composition and a second revision of the media composition, wherein the first and second revisions of the media composition are represented in terms of a first compositional data format that is a native format of the first media editing application, and wherein the media difference engine, in response to receiving the first revision and the second revision of the media composition:

locates and installs a difference plug-in software module corresponding to the first compositional data format;

generates a native change list that specifies differences between the first revision of the media composition and the second revision of the media composition in terms of the first compositional data format; and exports the first revision of the media composition and the native change list storing the first revision of the media composition and the native change list in a content management system, and wherein the media difference engine, in response to receiving the first revision and the second revision of the media composition further:

locates and installs:

a composition converter software plug-in module corresponding to the first compositional data format; and a change list converter and exporter plug-in software module corresponding to the first compositional data format; and uses the composition converter software plug-in module to convert the first revision of the media composition in the first compositional data format into an interoperable compositional format and to export the first revision of the media composition in interoperable format;

uses the change list converter and exporter plug-in software module to convert the native change list into a corresponding canonical change list and to export the canonical change list from the media difference engine; and stores the interoperable format media composition and the canonical change list in the content management system.

5. The method of claim 4, further comprising enabling an operator using a second media editing application different from the first media editing application to:

retrieve the first revision of the media composition represented in the interoperable format and the canonical change list from the content management system; and apply at least some of the changes specified in the canonical change list to the first revision of the media composition represented in terms of an interoperable compositional format to generate a second revision of the media composition represented in terms of a second compositional data format that is a native format of the second media editing application.

6. The method of claim 5, wherein the first media editing application is a non-linear video editing application, and the second media editing application is a digital audio workstation.

* * * * *